United States Patent
Roger et al.

(10) Patent No.: US 9,666,082 B2
(45) Date of Patent: May 30, 2017

(54) METHOD AND SYSTEM FOR GUIDANCE OF AN AIRCRAFT

(71) Applicant: THALES, Courbevoie (FR)

(72) Inventors: Michel Roger, Blagnac (FR); Mathieu Orvain, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/978,812

(22) Filed: Dec. 22, 2015

(65) Prior Publication Data

US 2016/0180716 A1   Jun. 23, 2016

(30) Foreign Application Priority Data

Dec. 23, 2014   (FR) ..................... 14 02971

(51) Int. Cl.
*G08G 5/00* (2006.01)
*G05D 1/00* (2006.01)

(52) U.S. Cl.
CPC ......... *G08G 5/0034* (2013.01); *G05D 1/0088* (2013.01); *G08G 5/0021* (2013.01); *G08G 5/0047* (2013.01); *G08G 5/0052* (2013.01)

(58) Field of Classification Search
CPC .. G08G 5/0034; G08G 5/0052; G08G 5/0021; G08G 5/0047; G05D 1/0088; G05D 1/0055
See application file for complete search history.

(56) References Cited

U.S. PATENT DOCUMENTS

| | | | |
|---|---|---|---|
| 6,377,875 B1 | 4/2002 | Schwaerzler | |
| 9,139,289 B2* | 9/2015 | Raynaud | .................. G05B 9/03 |
| 2004/0193334 A1 | 9/2004 | Carlsson et al. | |
| 2007/0093946 A1 | 4/2007 | Gideoni | |
| 2007/0129855 A1* | 6/2007 | Coulmeau | ............ G08G 5/0039 701/3 |
| 2007/0219678 A1* | 9/2007 | Coulmeau | ............ G08G 5/0039 701/3 |
| 2007/0219679 A1* | 9/2007 | Coulmeau | ............ G08G 5/0039 701/3 |
| 2008/0065312 A1* | 3/2008 | Coulmeau | .............. G01C 23/00 701/122 |

(Continued)

*Primary Examiner* — Jerrah Edwards
*Assistant Examiner* — Majdi Alsomiri
(74) *Attorney, Agent, or Firm* — Baker & Hostetler LLP (57) ABSTRACT

A method of flight management and guidance of an aircraft executed by a flight management system FMS comprises the steps of: generating a reference trajectory, generating a short-term trajectory, periodically transmitting the short-term trajectory, generating a long-term trajectory, formatting the segments of the long-term trajectory, periodically transmitting the long-term trajectory, storing the long-term trajectory transmitted, testing the validity of the FMS sub-assembly, when the FMS sub-assembly is valid: identifying, by the autonomous guidance module, the active segment of the short-term trajectory, generating, by the autonomous guidance module, a first flight guidance order on the basis of the active segment of the short-term trajectory; when the FMS sub-assembly is not valid: identifying, by the autonomous guidance module, the active segment of the stored trajectory, generating, by the autonomous guidance module, a second flight guidance order on the basis of the active segment of the stored trajectory.

10 Claims, 4 Drawing Sheets

(56) References Cited

U.S. PATENT DOCUMENTS

| | | | |
|---|---|---|---|
| 2008/0319591 A1* | 12/2008 | Markiton | G01C 23/00 701/14 |
| 2009/0018713 A1* | 1/2009 | Coulmeau | G08G 5/0013 701/3 |
| 2011/0276199 A1* | 11/2011 | Brot | G05D 1/0077 701/3 |
| 2012/0173052 A1* | 7/2012 | Nicolas | G08G 5/0039 701/3 |
| 2013/0184899 A1* | 7/2013 | Raynaud | G05B 9/03 701/3 |

* cited by examiner

METHOD AND SYSTEM FOR GUIDANCE OF AN AIRCRAFT

CROSS-REFERENCE TO RELATED APPLICATION

This application claims priority to foreign French patent application No. FR 1402971, filed on Dec. 23, 2014, the disclosure of which is incorporated by reference in its entirety.

FIELD OF THE INVENTION

The present invention relates to a method and a system for the guidance of an aircraft by a flight management system. More particularly the invention relates to a guidance method, some of the steps of which are carried out by an autonomous guidance module outside the core of the flight management system.

BACKGROUND

A flight plan is the detailed description of the route to be followed by an aircraft within the framework of a planned flight. The flight plan is usually managed aboard civil aircraft by a system referred to as the "Flight Management System", indicated as the FMS subsequently, which places the route to be followed at the disposal of the onboard personnel and at the disposal of the other onboard systems. This FMS system also allows an aid to navigation, through the display of information useful to the pilots, or else through the communication of flight guidance orders to an automatic piloting system.

Figure 1:
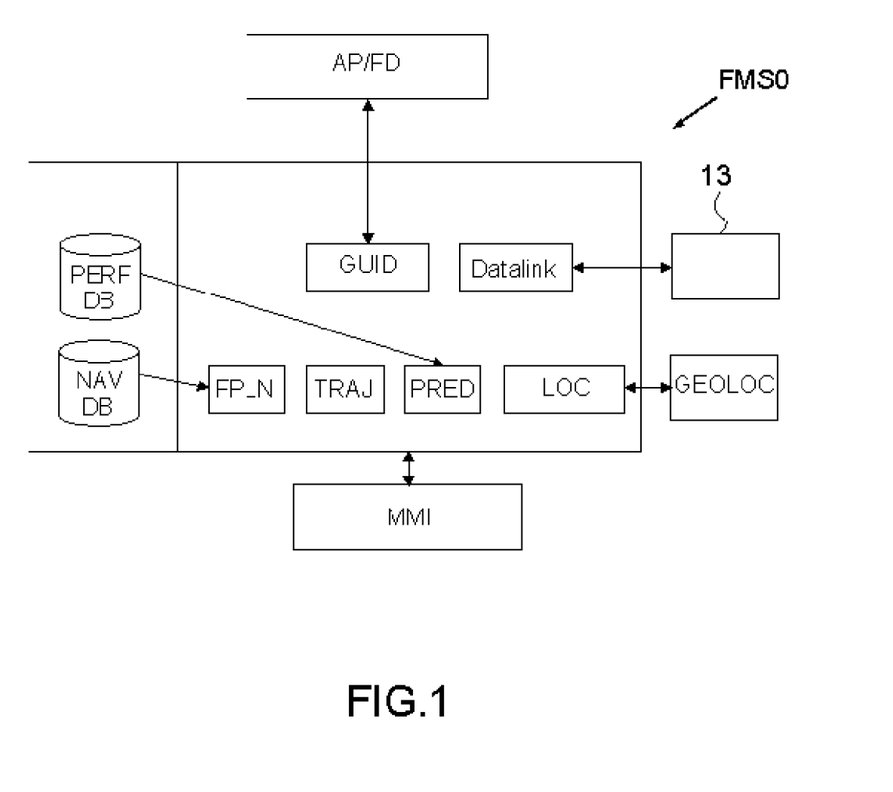
FIG. 1 already cited describes the structure of an FMS known from the prior art.

FIG. 1 presents a summary diagram illustrating the structure of an FMSO known from the prior art. A known FMSO-type system has a man-machine interface MMI comprising for example a keyboard and a display screen, or else simply a touch-sensitive display screen, as well as at least the following functions, which are illustrated in a generic manner by an associated module and are described in the ARINC 702 standard:

Navigation LOC performs the optimal location of the aircraft as a function of the geo-location means GEOLOC such as satellite based geo-positioning or GPS, VHF radio navigation beacons, inertial units. This module communicates with the aforementioned geo-location devices. Thus the module LOC calculates the position (latitude, longitude, altitude) and the speed of the aircraft in space.

Flight plan FPLN inputs the geographical elements constituting the skeleton of the route to be followed, such as the points imposed by the departure and arrival procedures, the waypoints, the airways;

Navigation database NAVDB contains the waypoints, the geographical routes, the procedures and the beacons Performance database PERFDB contains the craft's aerodynamic performance and engine parameters;

Lateral trajectory TRAJ, constructs by calculation a continuous trajectory on the basis of the points of the flight plan, using the performance of the aircraft and while complying with the confinement constraints (RNP);

Predictions PRED, constructs an optimized vertical profile on the lateral trajectory and provides the predictions in terms of time of transit, quantity of fuel remaining, altitude and speed of transit at each of the points of the flight plan.

Guidance GUID establishes, on the basis of the position and of the calculated trajectory, flight guidance orders so as to guide the aircraft in the lateral, vertical planes and speed flight targets so as to follow its three-dimensional trajectory, while optimizing its speed. The flight guidance orders are transmitted to the automatic pilot. When the aircraft is equipped with an automatic pilot PA and it is operative, it is this that transforms the flight guidance orders into flight control commands.

Digital data link DATALINK communicates with the air traffic control centres, the ground operational centres and, in the future, other aircraft 13.

The flight plan is entered by the pilot, or else by data link, on the basis of data contained in the navigation database.

The pilot thereafter inputs the aircraft parameters: mass, flight plan, range of cruising levels, as well as one or a plurality of optimization criteria, such as the Cost Index CI. These inputs allow the modules TRAJ and PRED to calculate respectively the lateral trajectory and the vertical profile, that is to say the flight profile in terms of altitude and speed, which for example minimizes the optimization criterion.

Thus in a conventional manner a flight management system:

calculates a position of the aircraft (LOC) on the basis of data arising from onboard sensors listed hereinabove, determines a trajectory (TRAJ/PRED module) with the databases PERF DB, in accordance with the flight plan defined on the basis of the NAV DB provides, on the basis of the position and of the trajectory, flight guidance orders (GUID module), so as to follow this trajectory. In a conventional manner, the calculated aircraft position makes it possible to identify a possible deviation from the trajectory or a forthcoming change (turn, climb, acceleration or deceleration) of the trajectory. On the basis of this lateral deviation, GUID will establish a flight guidance order CG, in a conventional manner made up of: roll, heading or track laterally, pitch, speed, vertical speed, altitude or slope vertically, speed or thrust level in terms of speed. Hereinafter in the disclosure, the term "guidance order" covers the set of flight guidance orders as defined hereinabove.

More precisely, the GUID module of the FMS computes the flight guidance orders on the basis of the position of the aircraft, of the part of the calculated trajectory that the aircraft is currently flying and of the guidance laws that are available in the automatic pilot and often specific to each aircraft. Among the laws of the automatic pilot, the FMS uses for example, laterally, the heading hold, vertically, the slope hold, the capture and hold of the altitude, in terms of speed the speed hold or thrust hold.

The trajectory calculated by the FMS comprises three components:
a lateral trajectory (latitude, longitude)
a vertical trajectory or profile
a speed profile—longitudinal axis The computed trajectory is always the same whatever the aircraft whereas the steering over this trajectory is dependent on the characteristics of each type of aircraft.

Guidance characterization is as follows: guidance along a lateral axis for the lateral guidance of the aircraft, along a vertical axis for the guidance in terms of altitude of the aircraft and along a longitudinal axis for the guidance in terms of speed.

The aircraft trajectory calculated by the FMS consists of an ordered series of segments that the aircraft follows as it progresses. Typically the segments are established according to the ARINC 424 standard legs of the flight plan. The current segment that the aircraft is presently flying is called the active segment.

The steering, that is to say the actual guidance of the aircraft, is performed on the active segment of the calculated trajectory. "Sequencing" refers to the identification of the active segment. This identification, carried out by the FMS, is essential for the generation of the flight guidance orders, associated with the active segment.

Figure 2:
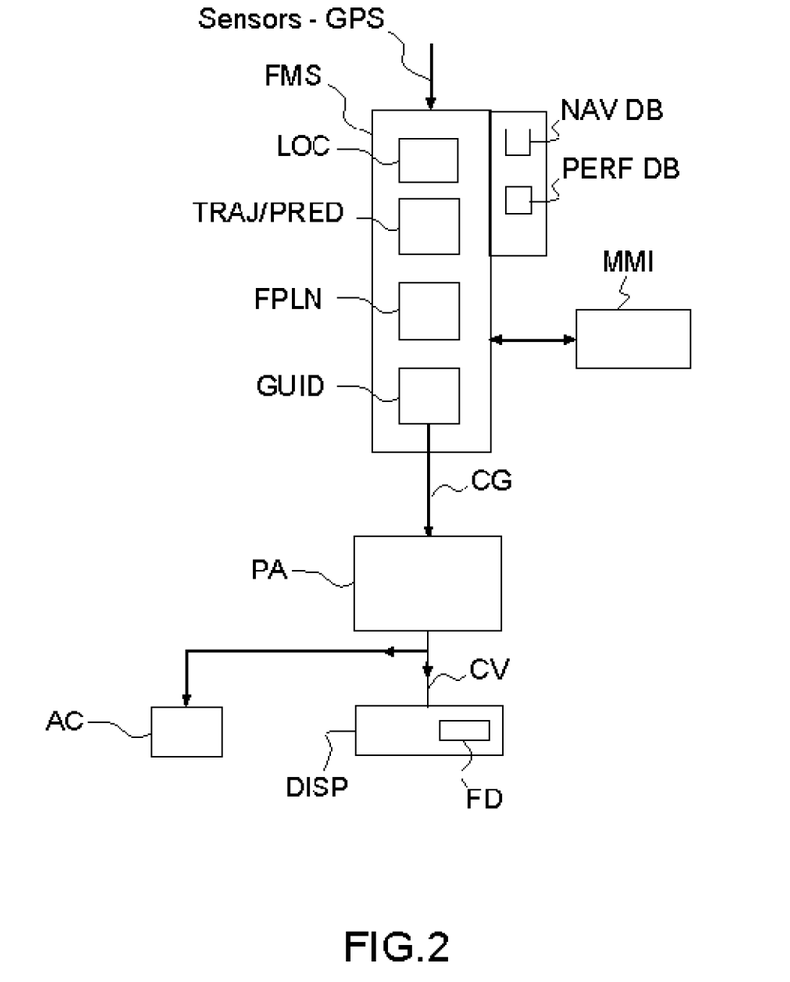
FIG. 2 already cited describes an architecture for flight management and guidance of an aircraft according to the prior art.

As illustrated in FIG. 2, the flight guidance orders generated by the GUID module of the FMS are transmitted to the automatic pilot PA. The PA transforms the flight guidance orders into flight controls CV applied directly to the aircraft symbolized by AC in FIG. 2. In a conventional manner, the automatic pilot generates and optionally dispatches to the control surfaces of the aircraft: the position (angle) for the ailerons and elevators, the thrust for the engines, etc.

Moreover, these flight controls are presented to the pilot via the flight director DV in the form for example of vertical and lateral bars (that the pilot must try to follow by hand when the automatic pilot is not engaged) on a display DISP.

An automatic pilot PA makes it possible to guide an aircraft automatically on the basis of flight guidance orders provided, either by the pilot ("tactical") through an interface called FCU (AIRBUS) or MCP (BOEING) (so-called "selected" mode) or by a system of FMS type ("strategic" so-called "managed" mode). We are interested here in guidance on the basis of the FMS. In a conventional manner, the automatic pilot determines the deviation between the current attitude (roll, pitch) of the aircraft and the desired flight guidance order (pilot selection or guidance control of the FM) and generates a flight control command CV on the basis of a piloting law.

An automatic pilot operates according to various modes, depending on the distribution of the guidance between the PA and the pilot.

In the manual mode, the pilot guides the aircraft laterally and vertically by providing flight controls with his stick and guides the aircraft in terms of speed by providing thrust controls with the throttle.

The PA is said not coupled. When the PA is coupled it is said "engaged".

In the so-called "selected" mode the pilot delegates guidance of the aircraft to the automatic pilot and to the auto throttle. He selects flight guidance orders (heading, altitude, slope, speed) through a control panel that the automatic pilot transforms into flight controls for the lateral and the vertical, and into thrust for the speed.

In the "managed" mode, termed "lateral and vertical and speed managed", also called "full managed", guidance is carried out laterally on the basis of the lateral trajectory, vertically on the basis of the vertical profile in terms of latitude, and in terms of speed, on the basis of the speed profile. The pilot delegates to the FM the selection of the flight guidance orders to follow the flight plan. The FM automatically selects the flight guidance orders for following the flight plan and dispatches them to the automatic pilot and to the auto-throttle which transforms them into flight and thrust controls.

According to a "lateral managed, vertical selected, speed selected" mode the managed guidance of the PA is a lateral guidance solely, on the basis of the lateral trajectory, the pilot remaining in charge of the controls for the altitude and the speed of the aircraft.

According to the prior art there exist various types of automatic pilots which are more or less elaborate: certain automatic pilots accept only roll and pitch inputs from the FMS. Others in addition to these basic inputs, afford access to higher flight targets such as heading, altitude, slope. Yet others PA are responsible for all of the steering laws, including that the FMS usually uses to provide roll and pitch, the FMS then providing only deviations with respect to the reference trajectory.

Thus, today, most FMSs are designed to prepare and steer an aircraft over a complete reference trajectory ("managed" mode see above) automatically. Unfortunately, though the complete trajectory (also called a 4D profile) from one aircraft to another is still characterized by the succession of rectilinear or curved segments, the steering over this trajectory is eminently different therefrom. Consequently, current flight management systems must still modify their guidance function to take account not only of the specifics of the aircraft's performance, but also of the aircraft manufacturer's philosophy characterized by the interface between the flight management system and the automatic pilot system and therefore of the scope that he grants to each of these systems.

The problem which comes therefrom is that, each time that the FMS is developed for a new aircraft or for a new aircraft manufacturer, it is necessary not only to modify the guidance function to adapt it to its new environment, but also to fully recertify the FMS since this function is internal to this system.

Certain procedures require a more significant level of precision in the guidance of the aircraft. For example, towards the end of the cruising phase and a few minutes before beginning the descent, the pilot selects via the FMS the approach procedure that he will use to put the aircraft down on the landing runway of his destination airport. The approach procedure for certain airports is of the RNP AR type with RNP<0.3 NM.

The RNP concept used in the aeronautical industry consists on the one hand in the capacity of the aircraft's navigation system to monitor its performance (precision) and to inform the pilot as to whether or not the operational requirements (error) are adhered to during the operation, and on the other hand in the optimization of the approach procedures by basing them on the aircraft's navigation performance. This concept makes it possible to reduce the spacings between aircraft while cruising and in the terminal zone, to optimize the takeoff and landing procedures. It also makes it possible to reduce the minima associated with the approach procedures both in non-precision approaches and in conventional RNAV approaches.

An RNP procedure refers to a specific procedure or a block of space. For example, an RNP procedure xx signifies that the navigation systems of the aircraft must be capable of calculating the position of the aircraft in a circle of xx Nm, for example an RNP 0.3 in a circle of 0.3 Nm.

Approaches of RNP AR type require continuity and integrity of the guidance even after a simple fault. Apart from a problem inherent to the conventional FMS system is that the calculation of a trajectory flyable by the aircraft (in accordance with its performance) and of precise predictions use complex algorithmic calculations, and that this complexity is a source of fault called reset. These faults cause the loss of the FMS, and in the current state not only is the trajectory lost but in addition the guidance on this trajectory is lost since both these functions are managed by the lone FMS system.

Thus, this type of approach requires FMS architectures which render the guidance function which steers the aircraft over the reference trajectory more robust and available.

Availability of the trajectory is particularly significant in the procedures with RNP AR with RNP<0.3 nm.

In the prior art, there exists a solution for reducing the loss and increasing the integrity of the guidance function. This solution relies on an architecture with 3 FMSs and therefore exhibits a much higher cost, with the purchase of a $3^{rd}$ instance of FMS, and higher electrical consumption, because of the electrical consumption of this additional item of equipment.

An aim of the present invention is to alleviate the aforementioned drawbacks by proposing a method and a system for the guidance of an aircraft making it possible to carry out this guidance independent of the functional core of the FMS.

SUMMARY OF THE INVENTION

The subject of the present invention is a method of flight management and guidance of an aircraft executed by a flight management system, the flight management system comprising an FMS sub-assembly and an autonomous guidance module independent of the FMS sub-assembly, the method comprising the steps consisting in:

generating, by the FMS sub-assembly, a reference trajectory according to three axes, lateral, vertical and longitudinal, and comprising an ordered series of segments, the aircraft flying the segments successively as it progresses, the current segment presently being flown being called the active segment, periodically generating, on the basis of the reference trajectory, a short-term trajectory, the short-term trajectory comprising a predefined number between of segments of the reference trajectory, and comprising the active segment, periodically transmitting the short-term trajectory to the autonomous guidance module, periodically generating, on the basis of the reference trajectory, a long-term trajectory, the long-term trajectory comprising a predefined number of segments of the reference trajectory comprising the active segment and being greater than or equal to the predefined number of segments of the short-term trajectory, formatting the segments of the long-term trajectory so as to ensure long-term synchronization between the three axes, periodically transmitting the long-term trajectory to the autonomous guidance module, storing, by the autonomous guidance module, the long-term trajectory transmitted called the stored trajectory, testing, by the autonomous guidance module, the validity of the FMS sub-assembly, when the FMS sub-assembly is valid:

identifying, by the autonomous guidance module, the active segment of the short-term trajectory, generating, by the autonomous guidance module, a first flight guidance order on the basis of the active segment of the short-term trajectory, the first flight guidance order being able, via an automatic pilot, to guide the aircraft over the short-term trajectory along the three axes, when the FSM sub-assembly is not valid:

Identifying, by the autonomous guidance module, the active segment of the stored trajectory, generating, by the autonomous guidance module, a second flight guidance order on the basis of the active segment of the stored trajectory, The second flight guidance order being able, via an automatic pilot, to carry out autonomous guidance of the aircraft along at least the lateral axis of the stored trajectory.

BRIEF DESCRIPTION OF THE DRAWINGS

Other characteristics, aims and advantages of the present invention will become apparent on reading the detailed description which follows with regard to the appended drawings given by way of nonlimiting examples and in which.

DETAILED DESCRIPTION

Figure 3:
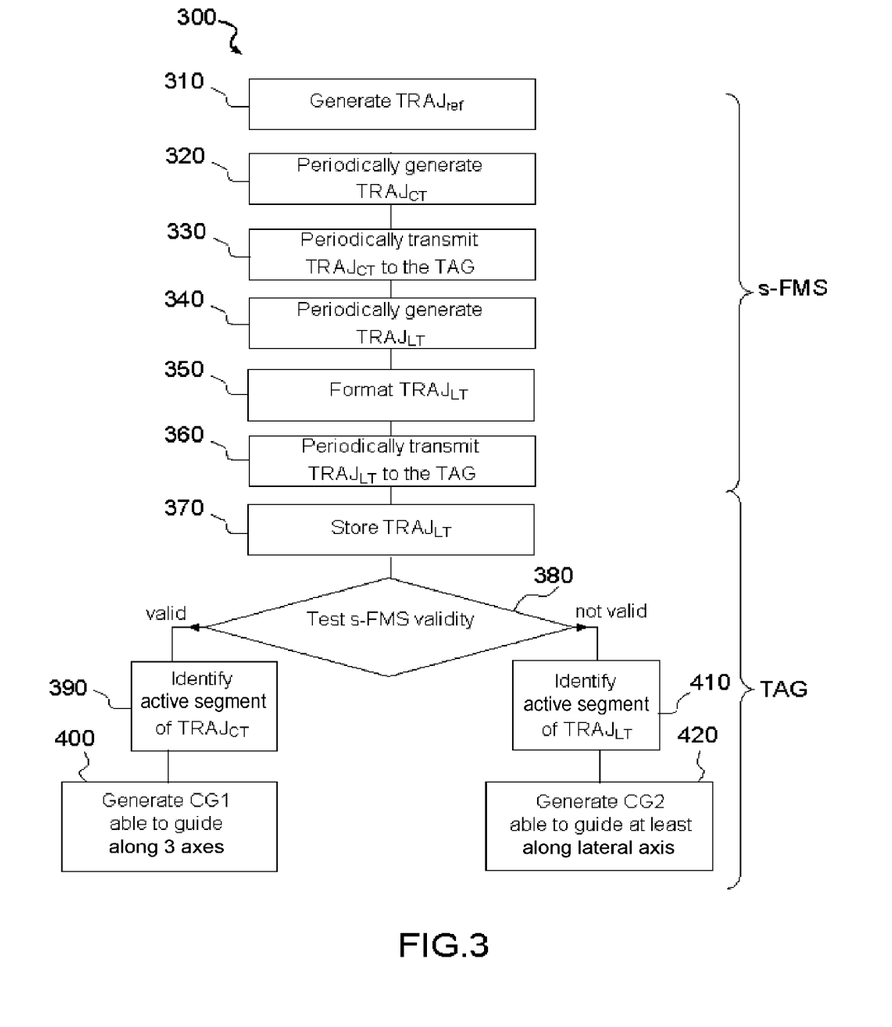
FIG. 3 illustrates the method according to the invention.

The method 300 of flight management and guidance of an aircraft according to the invention is described in FIG. 3. The method is executed by a flight management system FMS. Here FMS is intended to mean an overall system, able to carry out the set of functions described in the prior art, but in a different manner as described further on.

The flight management system FMS according to the invention comprises a first module called the FMS sub-assembly, s-FMS (sub FMS) corresponding to a modified sub-assembly of a complete FMS of the prior art, which is able to generate a reference trajectory along the three axes, lateral, vertical and longitudinal, and an autonomous guidance module called TAG (for "Trajectory Autonomous Guidance") independent of s-FMS. Thus the s-FMS constitutes a part of the overall FMS, including the LOC, TRAJ, PRED, FPLN, NAVDB, PERF DB, DATALINK functions, no more the GUID function.

The method 300 according to the invention comprises a first step, operated by s-FMS, consisting in generating 310 a reference trajectory TRAJref according to the three axes, lateral, vertical and longitudinal, and comprising an ordered series of segments, the aircraft flying the segments successively as it progresses, the current segment presently being flown being called the active segment.

The reference trajectory TRAJref generated by s-FMS is a trajectory such as described in the prior art. It comprises a lateral trajectory (latitude, longitude), a vertical trajectory commonly called the vertical profile (altitude), and a speed profile.

The lateral trajectory is decomposed into an ordered series of lateral segments, corresponding to straight lines or curves (lateral axis).

The vertical profile is decomposed into vertical segments corresponding typically to slopes allowing the aircraft to reach the calculated target altitudes (vertical axis).

The speed profile is decomposed into segments called longitudinal segments, comprising constant-speed segments separated by acceleration and deceleration segments making it possible to reach the calculated target speeds (longitudinal axis).

The reference trajectory therefore comprises all the segments, lateral, vertical and longitudinal. Preferentially, all these segments established from the ARINC 424 aeronautical standard legs.

Typically all the segments (lateral, vertical and longitudinal) are referenced in distance with respect to the destination which is the common reference shared by all the axes.

Preferentially the reference trajectory is regularly updated by the FMS.

These updates take place automatically with respect to the current weather conditions (arising from the onboard sensors) and while taking account of the weather predictions which are provided to the FMS. These updates of the reference trajectory may also follow up a modification of the corresponding flight plan by the pilot.

Typically currently an FMS calculates a reference trajectory in about twenty seconds or so. If it does not have any other priority tasks to perform, as soon as a trajectory calculation has terminated, the FMS begins a new one, using the real-time updating of the onboard sensors.

A step 320 periodically generates, on the basis of the reference trajectory TRAJref, a short-term trajectory TRAJ$_{CT}$ comprising a predefined number NI$_{CT}$ of segments of the reference trajectory, and comprising the active segment. The short-term trajectory is preferentially a complete trajectory comprising lateral, vertical and longitudinal segments. For example, the number N$_{CT}$ is between 1 and 5.

A step 330 periodically transmits the short-term trajectory TRAJ$_{CT}$ to the autonomous guidance module TAG. Typically, a short-term trajectory is generated and then transmitted to the TAG at each publication of the reference trajectory. Refreshing thereof is therefore fast.

The periodic generation of the short-term trajectory on the basis of the reference trajectory makes it possible to take into account the progress of the aircraft (change of active segment as the flight proceeds) and the regular updates of the reference trajectory which are performed by the FMS.

According to a preferred mode, the transmission of the short-term trajectory takes place at each generation of a new short-term trajectory.

A step 340 periodically generates, on the basis of the reference trajectory TRAJref, a long-term trajectory TRAJ$_{LT}$ comprising a predefined number N$_{LT}$ of segments of the reference trajectory and comprising the active segment.

The number of segments N$_{LT}$ of the long term trajectory is greater than or equal to the number of segments N$_{CT}$ of the short term trajectory.

Preferably, the number N$_{LT}$ is greater than 10.

The periodic generation of the long-term trajectory on the basis of the reference trajectory makes it possible to take into account the regular updates of the reference trajectory which are performed by the FMS. According to a preferred mode, the transmission of the long-term trajectory takes place at each generation of a new long-term trajectory.

According to one option the long-term trajectory is equal to the reference trajectory. According to another option, the long-term trajectory comprises a number between 10 and 100 of segments N$_{LT}$. Preferentially, the long-term trajectory preferentially comprises segments according to the three axes.

Thus the short-term and long-term trajectories are both extracted from the reference trajectory by s-FMS. Preferentially the segments of these trajectories on the lateral axis are defined from the ARINC 424 aeronautical standard legs of the flight plan.

A step 350 formats the segments of the long-term trajectory TRAJ$_{LT}$ so as to ensure long-term synchronization between the three axes.

The objective of the formatting is to allow the TAG, under certain conditions, and as is described further on, to generate a flight guidance order on the basis of long-term trajectory transmitted to the TAG. Accordingly the object of the formatting is to recover all the information useful for guidance. Synchronization needs to be ensured so that during sequencing (passage from one active segment to the next during guidance), the appropriate lateral, vertical and longitudinal segment is taken into account. For example that when entering on a turn, it is the appropriate speed which is applied.

Formatting consists for example of a rearrangement of the initial segments and additions of elements to the long-term trajectory. These elements contain information allowing the TAG to ensure at any instant the mutual coherence of the various segment types.

Indeed, without formatting, the TAG would not know to anticipate a change of speed and consequently could trigger the commencement of a turn at the wrong moment causing the aircraft to deviate from the reference trajectory. For example, for the lateral segments, the formatting comprises an addition in certain cases of the origin leg, which makes it possible in certain forms of trajectory such as holding pattern to know on which rectilinear portion of the hold the aircraft is situated.

For the vertical and longitudinal segments, often coupled in terms of profile (altitude speed), the formatting comprises for example segments of start of acceleration or start of deceleration type so as to tag the moment at which the change of speed ought to be implemented during a change of direction to follow a turn.

The formatting has added information to the trajectory transmitted so as to allow autonomous guidance. Now, it is not necessary to increase the latency due to the transmission of a significant data flow. Another contribution of the formatting consists in deleting information such that associated with the sequencing of a leg, information which is useful to the FPLN but not useful to an autonomous GUID.

Synchronization between the various lateral, vertical, longitudinal segments of the short-term trajectory is ensured by its fast refreshing, therefore there is no need to format it.

A step 360 periodically transmits the long-term trajectory TRAJ$_{LT}$ to the autonomous guidance module TAG.

The transmission of the short-term trajectory takes place at a first relatively fast frequency F1, typically a few 2 to 3 seconds in the approach phase, and the transmission of the long-term trajectory takes place at a second frequency F2 lower than the first frequency, typically a few 10 to 20 seconds in the approach phase.

The short-term trajectory has a tactical aim since it relates to the immediate guidance of the aircraft. The long-term trajectory has a strategic aim and typically comprises information associated with the destination such as the distance to the destination, the arrival time and the fuel remaining.

In a step 370 the autonomous guidance module TAG stores the long-term trajectory which is transmitted to it by the s-FMS. The formatted long-term trajectory, transmitted to the TAG and stored by the latter is called the stored trajectory hereinafter in the disclosure.

During step 380, the TAG tests the validity of the s-FMS sub-assembly, this comprising the test of the validity of the reception of the short-term trajectory.

When s-FMS is valid, according to the example the reception of the short-term trajectory is valid, the TAG identifies, in 390, the active segment of the short-term trajectory and generates in 400 a first flight guidance order CG1 on the basis of the active segment of the short-term trajectory. The first flight guidance order CG1 is able to guide the aircraft on the three axes, lateral, vertical and longitudinal, on the basis of the short-term trajectory, via an automatic pilot PA and according to known modes from the prior art.

Preferentially, at the s-FMS level, a hardware component remains responsible for detecting the events which lead to the sequencing of the legs of the flight plan as well as for detecting the events which lead to an updating of the reference trajectory. The TAG consumes the new short-term trajectories produced.

The guidance on a correctly transmitted short-term trajectory, "outsourced" from the s-FMS to the TAG, makes it possible to maintain guidance on this $TRAJ_{CT}$ for short-duration faults of the FMS. The FMS performs complex calculations, and from time to time it undergoes software incidents, called "software exceptions" which compel it to reboot. During the rebooting time (typically from 1 s to 5 s), the FMS is no longer operational, but the guidance in progress by the TAG on $TRAJ_{CT}$ can continue without interruption at least until the aircraft flies this short term trajectory completely. Thus the guidance on the basis of the current short-term trajectory can be carried out when the FMS is not functional during a time period which is smaller than the flight time of this current short-term trajectory, the guidance is therefore "robust" to a fault of short duration, such as a software exception.

When s-FMS is not valid, that is to say according to the example that the reception of the short-term trajectory is not valid, the TAG identifies at 410 the active segment of the stored trajectory and generates at 420 a second flight guidance order CG2 on the basis of the active segment of the stored trajectory. The second flight guidance order CG2 being able, via an automatic pilot, to carry out autonomous guidance of the aircraft along at least the lateral axis of the stored trajectory. As a function of the type of aircraft, there may be one or more automatic pilots, and the flight guidance order CG2 is not necessarily transmitted to the same automatic pilot as the flight guidance order CG1 when there are several of them.

The guidance on the basis of the stored trajectory, which is not refreshed as often as the short-term trajectory, is not as complete a guidance as the guidance on the short-term trajectory. Indeed, the autonomous guidance will undergo the weather effects such as changes of wind without any anticipation, it is therefore in reactive mode and it will be more complicated for it to maintain the aircraft on this stored trajectory.

In the method according to the invention, it is the TAG which tests the validity of s-FMS, and which, when it detects an anomaly, toggles to the guidance on the stored trajectory. According to the example, non-valid reception of the short-term trajectory signifies that the s-FMS has become invalid following a fault of a certain duration.

Thus the stored long-term trajectory is used by the TAG for the case in which s-FMS is invalid, for example so that the aircraft can terminate a mission following a total loss of FMS. Preferentially the TAG continues to use the same logic for flight guidance order calculations as in the nominal mode (s-FMS valid), with the exception of the flight guidance orders for speed and next altitude holding level that the TAG identifies by itself.

Thus the TAG autonomous guidance function has two modes of operation.

A nominal mode for which the FMS core system is valid, and s-FMS valid.

In this mode, the functional core calculates the 3D reference trajectory until the destination, updates it periodically and transmits the short-term portion, typically the 2 or 3, or up to 5 legs or segments in all the axes, lateral, vertical and longitudinal ahead of the aircraft, to the TAG outsourced guidance. The TAG performs the calculation of flight guidance order making it possible to follow this trajectory and ensures the sequencing of the segments of this trajectory.

A degraded mode in which the FMS core system is invalid, the consequence of this being that it no longer delivers a short-term trajectory.

In this mode, the TAG module uses the long-term 3D trajectory provided regularly by the s-FMS system and that it has recorded. In a manner identical to the nominal mode, it performs the calculation of flight guidance orders making it possible to follow the stored trajectory and ensures the sequencing in the 3 axes, lateral, vertical and longitudinal, of the segments of this stored 3D trajectory. The flight guidance orders destined for the PA and nominally identified by TRAJ (120) (Speed and Altitude of next holding level) will, in degraded mode, be identified by the TAG. In consequence, they will arise from the stored trajectory which is no longer updated in particular with respect to the weather, but also with respect to the actual trajectory followed by the aircraft. The TAG receives the position, the altitude, the speed, stated otherwise the vector of the aircraft now independently of the s-FMS and determines flight guidance orders in regard to the stored trajectory, by using the appropriate guidance laws.

Thus the method according to the invention proposes a solution for out-sourcing the guidance function, by having this function be carried out by an autonomous guidance application, thereby exhibiting several advantages.

Upon an s-FMS fault, the TAG is configured to toggle into the degraded mode. The existence of this mode makes it possible to provide continuity of guidance. Indeed, the TAG module is a system dissimilar to the s-FMS system, which can be carried on a hardware platform independent of that of s-FMS, and when there is a fault with the s-FMS application or with the hardware platform which supports the s-FMS, the TAG with its stored reference trajectory offers the capacity to continue to maintain the aircraft on the reference trajectory in automatic mode. The full benefit of this continuity is found in the case of critical procedures such as the approaches of RNP AR type with RNP<0.3 nm, for which it is required on the one hand to raise the integrity of the guidance (for example by splitting the FMS and the PA) and on the other hand to ensure continuity of the guidance.

Another advantage is to free the functional core of the FMS of the variability inherent in the guidance function. An alteration of the interface or of the distribution of the guidance function between FM and PA does not entail an alteration of the FMS functional core. This makes it possible to limit the cost of adaptation of the guidance function encountered for each new aircraft or aircraft manufacturer, whether it is in the interface with the automatic pilot or as regards the definition of the respective scopes of the automatic pilot and of the guidance function of the FMS.

Another advantage of this outsourced guidance is to make it easier to raise the integrity of the associated software, indeed the level of development of an FM will not exceed the so-called Hazardous integrity level requiring DAL B software, whereas it will be possible if the need arises to certify this TAG at the catastrophic integrity level requiring DAL A software.

According to an embodiment of the invention, the predefined number $N_{CT}$ of segments of the short-term trajectory is between 1 and 5 and/or the predefined number $N_{LT}$ of segments of the long-term trajectory is greater than 10.

According to a preferred variant the method according to the invention furthermore comprises a step of formatting the short-term trajectory. Preferentially the formatting is identical to the formatting of the long-term trajectory, in such a way that the autonomous guidance module TAG uses one and the same reading process for both trajectories.

According to one embodiment, the TAG the flight guidance orders CG2 in degraded mode is only able to guide the aircraft along a lateral axis. Preferentially in this mode the pilot remains in charge of the altitude and of the speed of the aircraft.

Indeed the lateral guidance does not exhibit the same variability as the vertical guidance. The lateral guidance consists in guiding the aircraft in the horizontal plane and in the case where the aircraft deviates from the stored lateral trajectory, there is a single strategy for restoring the aircraft onto the lateral trajectory, whereas the vertical guidance which may be implemented in the descent and approach phase according to different descent strategies, must know how to guide the aircraft with regard to 2 planes, the vertical plane (altitude) and the longitudinal plane (speed), stated otherwise must know how to manage the energy of the aircraft.

An operational example of implementation is an approach of RNP AR type with an RNP of less than 0.3 NM. Indeed for this type of approach, continuity and a high level of integrity are required in regard to lateral guidance since any error endangers the aircraft, whereas in regard to vertical guidance, in case of a problem climb enough to move away from the danger.

According to another embodiment the second flight guidance order CG2 is also able to carry out autonomous guidance of the aircraft along the vertical and longitudinal axes of the stored trajectory.

Typically, the TAG is able to ensure autonomous guidance in regard to all the axes in so far as the aircraft is on or near the reference trajectory when switching to autonomous (degraded) mode. If this is not the case, it is up to the pilot to restore the aircraft to the reference trajectory, both laterally and vertically, before being able to switch to degraded managed guidance mode, that is to say actual guidance via the PA on the basis of the flight guidance order CG2. Indeed, in the approach phase, even in the case for which s-FMS were to transmit all the constraints, constraining or not in the long term trajectory, the TAG is not able to create any new trajectory if for example one non constraining altitude constraint becomes a constraining constraint.

According to another example in the case where the vertical profile is simple (succession of slopes without any holding level) and the aircraft is above or below the profile, the TAG is able, in autonomous mode, to ensure vertical guidance since the strategy to be implemented is simple, with, below, a constant and weak descent (typically 500 Feet/minute) which makes it possible to regain the profile, and, above, a higher slope would do likewise.

Figure 4:
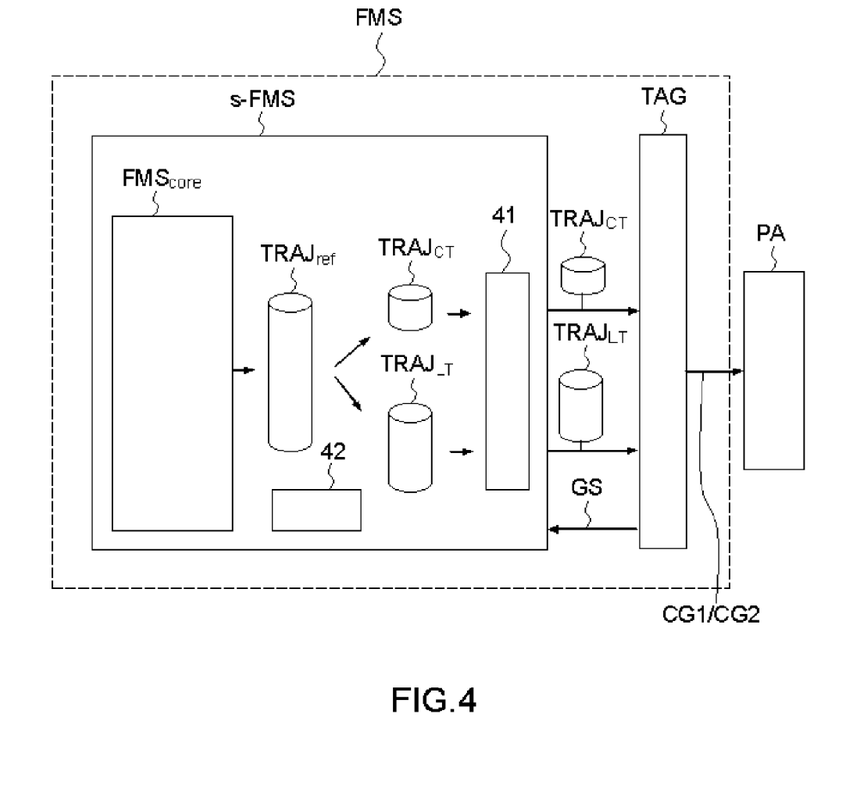
FIG. 4 illustrates a flight management system according to the invention.

According to another aspect the invention relates to a flight management system FMS illustrated in FIG. 4 comprising an FMS sub-assembly called s-FMS comprising an FMS core called FMScore, and an autonomous guidance module TAG independent of s-FMS.

FMScore is configured to generate a reference trajectory TRAJref according to three axes, lateral, vertical and longitudinal, comprising an ordered series of segments, the aircraft flying the segments successively as it progresses, the current segment presently being flown being called the active segment.

The FMS sub-assembly s-FMS is configured to:
periodically generate, on the basis of the reference trajectory TRAJref, a short-term trajectory $TRAJ_{CT}$, the short-term trajectory comprising a predefined number $N_{CT}$ of segments, and comprising the active segment,
periodically transmit the short-term trajectory $TRAJ_{CT}$ to the autonomous guidance module TAG,
periodically generate, on the basis of the reference trajectory TRAJref, a long-term trajectory $TRAJ_{LT}$, the long-term trajectory comprising a predefined number $N_{LT}$ of segments comprising the active segment and being greater than or equal to the predefined number ($N_{CT}$) of segments of the short-term trajectory,
format, by a formatting module 4, the segments of the long-term trajectory so as to ensure long-term synchronization between the three axes,
periodically transmit the long-term trajectory $TRAJ_{LT}$ to the autonomous guidance module TAG.

Thus the FMS sub-assembly constitutes a part of the overall FMS, including the LOC, TRAJ, PRED, FPLN, NAVDB, PERF DB, DATALINK functions, but no more the GUID function.

Preferentially s-FMS comprises a trajectory management module 42 configured to ensure the management of the secondary, temporary trajectories and active trajectory (reference trajectory). s-FMS retains its capacity to sequence the active trajectory, that is to say to identify the flight plan waypoint WP which has just been crossed by the aircraft. The notion of sequencing of the WPs must not be confused with the sequencing of the active segment in respect of guidance.

The autonomous guidance module TAG being configured to store the long-term trajectory transmitted $TRAJ_{LT}$ called the stored trajectory and to test the validity of the reception of the short-term trajectory.
when the reception is valid, the autonomous guidance module is configured to identify the active segment of the short-term trajectory and to generate a first flight guidance order CG1 on the basis of the active segment of the short-term trajectory, the first flight guidance order CG1 being able, via an automatic pilot PA, to guide the aircraft over the short-term trajectory along the three axes,
when the reception is not valid the autonomous guidance module is configured to identify the active segment of the stored trajectory and to generate a second flight guidance order CG2 on the basis of the active segment of the stored trajectory, the second flight guidance order CG2 being able, via an automatic pilot PA, to carry out autonomous guidance of the aircraft along at least the lateral axis of the stored trajectory.

The TAG regularly informs the FMS sub-assembly of the state of the guidance through GS (standing for "Guidance State") data.

According to a preferred embodiment, the formatting module 41 is also configured to format the short-term trajectory. Preferentially the formatting is identical to the formatting of the long-term trajectory, in such a way that the autonomous guidance module TAG uses one and the same reading process for both trajectories.

According to one embodiment the TAG module is carried by a specific partition of a common hardware platform shared with the s-FMS. According to another preferred embodiment, the TAG is mounted on a different hardware platform from that of the s-FMS, thereby freeing the autonomous guidance from a common hardware fault shared with the s-FMS.

According to another aspect, the invention relates to a computer program product comprising code instructions making it possible to perform the steps of the method according to the invention.

The method can be implemented on the basis of hardware and/or software elements. The method may be available as a computer program product on a computer readable medium.

The method can be implemented on a system able to use one or more dedicated electronic circuits or a general-purpose circuit.

The technique of the method according to the invention can be carried out on a reprogrammable calculation machine (a processor or a microcontroller for example) executing a program comprising a sequence of instructions, or on a dedicated calculation machine (for example a set of logic gates such as an FPGA or an ASIC, or any other hardware module).

The various modules of the system according to the invention can be implemented on one and the same processor or on one and the same circuit, or distributed over several processors or several circuits. The modules of the system according to the invention consist of calculation means including a processor.

The reference to a computer program which, when it is executed, performs any one of the functions previously described, is not limited to an application program executing on a single host computer. On the contrary, the terms computer program and software are used here in a general sense to refer to any type of computing code (for example, application software, micro software, microcode, or any other form of computer instruction) which can be used to program one or more processors to implement aspects of the techniques described here.

The invention claimed is:

1. A method of flight management and guidance of an aircraft executed by a flight management system, the flight management system comprising an FMS sub-assembly and an autonomous guidance module independent of the FMS sub-assembly, the method comprising the steps of:
    generating, by the FMS sub-assembly, a reference trajectory according to three axes, lateral, vertical and longitudinal, and comprising an ordered series of segments, the aircraft flying the segments successively as it progresses, the current segment presently being flown being called the active segment,
    generating periodically, on the basis of the reference trajectory, a short-term trajectory, the short-term trajectory comprising a predefined number of segments of the reference trajectory, and comprising the active segment,
    periodically transmitting the short-term trajectory to the autonomous guidance module,
    generating periodically, on the basis of the reference trajectory, a long-term trajectory, the long-term trajectory comprising a predefined number of segments of the reference trajectory comprising the active segment and being greater than or equal to the predefined number of segments of the short-term trajectory,
    formatting the segments of the long-term trajectory so as to ensure long-term synchronization between the three axes,
    periodically transmitting the long-term trajectory to the autonomous guidance module
    storing, by the autonomous guidance module, the long-term trajectory transmitted called the stored trajectory,
    testing, by the autonomous guidance module, the validity of the FMS sub-assembly,
    when the FMS sub-assembly is valid:
        identifying, by the autonomous guidance module, the active segment of the short-term trajectory,
        generating, by the autonomous guidance module, a first flight guidance order on the basis of the active segment of the short-term trajectory,
        the first flight guidance order being able, via an automatic pilot, to guide the aircraft over the short-term trajectory along the three axes and
    when the FSM sub-assembly is not valid:
        Identifying, by the autonomous guidance module, the active segment of the stored trajectory,
        generating, by the autonomous guidance module, a second flight guidance order on the basis of the active segment of the stored trajectory,
        the second flight guidance order being able, via an automatic pilot, to carry out autonomous guidance of the aircraft along at least the lateral axis of the stored trajectory.

2. The method according to claim 1, wherein the transmission of the short-term trajectory takes place at a first frequency and the transmission of the long-term trajectory takes place at a second frequency lower than the first frequency.

3. The method according to claim 1, further comprising a step of formatting the short-term trajectory, the said formatting being identical to the formatting of the long-term trajectory, in such a way that the autonomous guidance module uses one and the same reading process for both trajectories.

4. The method according to claim 1, wherein the predefined number of segments of the short-term trajectory is between 1 and 5 and the predefined number of segments of the long-term trajectory is greater than 10.

5. The method according to claim 1, wherein the number of segments of the long-term trajectory is between 50 and 100.

6. The method according to claim 1, wherein the validity test step consists in testing the validity of the reception of the short-term trajectory.

7. The method according to claim 1, wherein the second flight guidance order is also able to carry out autonomous guidance of the aircraft along the vertical and longitudinal axes of the stored trajectory.

8. A flight management system comprising:
    an FMS sub-assembly comprising an FMS core configured to generate a reference trajectory according to three axes, lateral, vertical and longitudinal, comprising an ordered series of segments, the aircraft flying the segments successively as it progresses, the current segment presently being flown being called the active segment, and comprising an autonomous guidance module independent of the FMS sub-assembly,
    the FMS sub-assembly being configured to:
        periodically generate, on the basis of the reference trajectory, a short-term trajectory, the short-term trajectory comprising a predefined number of segments of the reference trajectory, and comprising the active segment,
        periodically transmit the short-term trajectory to the autonomous guidance module,
        periodically generate, on the basis of the reference trajectory, a long-term trajectory, the long-term trajectory comprising a predefined number of segments of the reference trajectory comprising the active segment and being greater than or equal to the predefined number of segments of the short-term trajectory, format the segments of the long-term trajectory so as to ensure long-term synchronization between the three axes, periodically transmit the long-term trajectory to the autonomous guidance module the autonomous guidance module being configured to store the long-term trajectory transmitted called the stored trajectory and to test the validity of the FMS sub-assembly, when the FMS sub-assembly is valid, the autonomous guidance module is configured to identify the active segment of the short-term trajectory and to generate a first flight guidance order on the basis of the active segment of the short-term trajectory, the first flight guidance order being able, via an automatic pilot, to guide the aircraft over the short-term trajectory along the three axes and, when the FMS sub-assembly is not valid the autonomous guidance module is configured to identify the active segment of the stored trajectory and to generate a second flight guidance order on the basis of the active segment of the stored trajectory, the second flight guidance order being able, via an automatic pilot, to carry out autonomous guidance of the aircraft along at least the lateral axis of the stored trajectory.

9. The flight management system FMS according to claim 8, wherein the FMS sub-assembly is configured to format the short-term trajectory, the said formatting being identical to the formatting of the long-term trajectory, in such a way that the autonomous guidance module uses one and the same reading process for both trajectories.

10. A computer program product stored on a non-transitory computer readable storage medium, the said computer program product comprising code instructions to perform a method of flight management and guidance of an aircraft executed by a flight management system when said code instructions are executed by a processor, the flight management system comprising an FMS sub-assembly and an autonomous guidance module independent of the FMS sub-assembly, the method comprising the steps of:

generating, by the FMS sub-assembly, a reference trajectory according to three axes, lateral, vertical and longitudinal, and comprising an ordered series of segments, the aircraft flying the segments successively as it progresses, the current segment presently being flown being called the active segment, generating periodically, on the basis of the reference trajectory, a short-term trajectory, the short-term trajectory comprising a predefined number of segments of the reference trajectory, and comprising the active segment, periodically transmitting the short-term trajectory to the autonomous guidance module, generating periodically, on the basis of the reference trajectory, a long-term trajectory, the long-term trajectory comprising a predefined number of segments of the reference trajectory comprising the active segment and being greater than or equal to the predefined number of segments of the short-term trajectory, formatting the segments of the long-term trajectory so as to ensure long-term synchronization between the three axes, periodically transmitting the long-term trajectory to the autonomous guidance module storing, by the autonomous guidance module, the long-term trajectory transmitted called the stored trajectory, testing, by the autonomous guidance module, the validity of the FMS sub-assembly, when the FMS sub-assembly is valid:
  identifying, by the autonomous guidance module, the active segment of the short-term trajectory,
  generating, by the autonomous guidance module, a first flight guidance order on the basis of the active segment of the short-term trajectory,
  the first flight guidance order being able, via an automatic pilot, to guide the aircraft over the short-term trajectory along the three axes and when the FSM sub-assembly is not valid:
  identifying, by the autonomous guidance module, the active segment of the stored trajectory,
  generating, by the autonomous guidance module, a second flight guidance order on the basis of the active segment of the stored trajectory,
  the second flight guidance order being able, via an automatic pilot, to carry out autonomous guidance of the aircraft along at least the lateral axis of the stored trajectory.

* * * * *